(12) United States Patent
Harman et al.

(10) Patent No.: US 9,097,793 B2
(45) Date of Patent: Aug. 4, 2015

(54) SYSTEM FOR THE DETECTION OF INCOMING MUNITIONS

(75) Inventors: Stephen A Harman, Malvern (GB); Andrew L Hume, Malvern (GB)

(73) Assignee: QINETIQ LIMITED, Farnborough, Hampshire (GB)

( * ) Notice: Subject to any disclaimer, the term of this patent is extended or adjusted under 35 U.S.C. 154(b) by 351 days.

(21) Appl. No.: 13/638,651

(22) PCT Filed: Mar. 30, 2011

(86) PCT No.: PCT/GB2011/000476
§ 371 (c)(1),
(2), (4) Date: Oct. 1, 2012

(87) PCT Pub. No.: WO2011/121286
PCT Pub. Date: Oct. 6, 2011

(65) Prior Publication Data
US 2013/0021194 A1 Jan. 24, 2013

Related U.S. Application Data

(60) Provisional application No. 61/344,866, filed on Oct. 28, 2010.

(30) Foreign Application Priority Data

Mar. 31, 2010 (GB) .................................. 1005675.2

(51) Int. Cl.
*G01S 13/48* (2006.01)
*G01S 13/00* (2006.01)
*G01S 13/52* (2006.01)

(52) U.S. Cl.
CPC ............... *G01S 13/003* (2013.01); *G01S 13/48* (2013.01); *G01S 13/52* (2013.01)

(58) Field of Classification Search
CPC ........ G01S 13/003; G01S 13/52; G01S 13/48
USPC ...................... 342/104, 90–97, 106, 109–112
See application file for complete search history.

(56) References Cited

U.S. PATENT DOCUMENTS

| 5,867,118 | A | * | 2/1999 | McCoy et al. | .................. 342/90 |
| 8,842,037 | B2 | * | 9/2014 | Emery | .......................... 342/105 |
| 8,981,989 | B2 | * | 3/2015 | Gould et al. | .................. 342/113 |

(Continued)

FOREIGN PATENT DOCUMENTS

| DE | 3128990 | A1 | * | 2/1983 | .............. G01S 13/52 |
| EP | 1 286 180 | | | 2/2003 | |

(Continued)

OTHER PUBLICATIONS

International Search Report for PCT/GB2011/000476 mailed Jun. 27, 2011.

(Continued)

*Primary Examiner* — John B Sotomayor
(74) *Attorney, Agent, or Firm* — Nixon & Vanderhye P.C.

(57) ABSTRACT

A system for detecting munitions in flight comprises a radar transmitter, receiver, and associated antennas, wherein the antennas are oriented to include ground level coverage, and where a receive antenna is arranged to provide a plurality of receive beams. The system further incorporates a Doppler filter arranged to reject targets that have velocity profiles that do not match those expected of targets of interest. If a target of interest is detected then an indication is provided, preferably in the form of an audible alert, allowing those nearby time to take cover. The system provides a simple munitions detection capability that may operate in CW mode to allow rapid detection, and may also have means such as switchable FMCW, and elevation measurement to allow estimation of possible landing areas of the target.

15 Claims, 7 Drawing Sheets

(56) References Cited

U.S. PATENT DOCUMENTS

2006/0220946 A1 10/2006 Nohmi
2011/0241928 A1* 10/2011 Oswald et al. ............... 342/90

FOREIGN PATENT DOCUMENTS

| GB | 2033691 A * | 5/1980 |
|----|-------------|--------|
| GB | 2 250 153 | 5/1992 |
| GB | 2 333 198 | 7/1999 |
| JP | 2003-35769 | 2/2003 |

OTHER PUBLICATIONS

Search Report for GB 1005675.2 dated Oct. 22, 2010.

\* cited by examiner

SYSTEM FOR THE DETECTION OF INCOMING MUNITIONS

This application is the U.S. national phase of International Application No. PCT/GB2011/000476 filed 30 Mar. 2011 which designated the U.S. and claims priority to GB 1005675.2 filed 31 Mar. 2010, and U.S. Provisional Application No. 61/344,866 filed 28 Oct. 2010, the entire contents of each of which are hereby incorporated by reference.

This invention relates to radar systems, and in particular, radar systems designed to be used to provide rapid warning of high speed targets such as missiles, rockets or other munitions.

Many battlefield theatre scenarios involve the provision of operating bases at which troops may be deployed. These bases may comprise of different types. At one end of the scale there are large bases holding hundreds or thousands of troops, and which may act as a headquarters. Because of their size and importance these are generally heavily fortified, and well guarded. Strong surveillance and security measures may be practically employed around their perimeter and for some distance beyond it. Towards the other end of the scale there may be a larger number of smaller, and relatively vulnerable bases located near the front line, or at some distance from the larger bases. These hold relatively few troops, and may comprise of hastily constructed fortified temporary shelters. These smaller bases, and to some extent the larger bases such as the main headquarters, are vulnerable to attacks from rockets and munitions to varying degrees. Costly and complicated systems such as air platforms and sophisticated electronic surveillance may be deployed around the clock at the larger bases, but logistical, manpower and financial reasons mean that it is not possible to deploy them at all bases.

Rockets, such as the 107 mm spin stabilised rocket (SSR), are a current significant threat for operating bases, particularly the smaller ones. These are high speed, low flying rockets that have a range of approximately 2 km to 8 km, and are relatively simple to launch. Current sensor systems have limited effectiveness at detecting the approach of these devices, particularly those launched from shorter ranges. IR sensors are susceptible to decoys, and acoustic sensors are impractical due to the highly dense network of transducers that would be required.

Radar systems have proven to be somewhat lacking at detecting such rockets. Radars designed specifically for weapon locating have problems due to the low flight trajectory of these rockets. The scanning employed by these radars takes some time to do, which can mean that the detection is made too late to be of use. Other radars, i.e. those not specifically designed for weapon locating are of very limited use because the radar cross section of the rockets is very low. Any radar returns are therefore likely to be very small, and filtered out as noise. Also, many radars have a minimum range that is beyond the range where some of the rockets of interest are fired from.

It is an object of the present invention to provide a means for detecting rockets or similar ordnance in flight.

According to an aspect of the present invention there is provided a system for the detection of rockets and the like, the system comprising a radar, processing means and indication means wherein the radar has a transmitter, a receiver, and one or more antennas arranged to transmit a signal and to receive reflections of the signal from a region, characterised in that the antenna is arranged to have transmit and receive beams oriented to include ground level coverage, wherein the one or more antennas is arranged to provide a plurality of receive beams, each having an associated receiver chain, and wherein the processor incorporates a Doppler filter arranged to reject received signals corresponding to a target outside of predetermined velocity limits, these velocity limits being chosen as representative of maximum and minimum velocities of the targets of interest in flight, the indication means being adapted to provide an indication when a target velocity is within the predetermined velocity limits.

A system as described herein has the benefit of being a relatively low cost yet effective solution to the problem. The system may advantageously be a Continuous Wave (CW) system. By employing a CW radar the system is particularly cost effective, and relatively simple to design and manufacture. The simple architecture also means that the signal processing chain is very straightforward, and hence fast in operation. A warning can thus be generated a very short time after detection, in an environment where a delay of a second or two can be catastrophic. Also, CW radars do not have minimum range limitations inherent to some degree in pulsed radars. The system may be a modulated CW system, which has the advantage that range information may be obtained. The modulation may be frequency modulation (typically a frequency ramp signal), or a code modulation such as a phase coding.

Alternatively the radar may be a pulsed radar, which has the benefit of providing range information, but which suffers from the minimum range limitations as stated above.

Preferably the radar does not employ a scanned antenna beam pattern. Electronic or mechanical scanning of a beam adds latency into the system (because at any given moment the beam may not be directed towards an incoming target), and also increases the processing complexity. These all delay the activation of a warning.

Preferably the antenna is arranged to produce a transmit beam that has a wide angular field of view in azimuth, and a narrow field of view in elevation. Most targets of interest have a low trajectory, and so the narrow field of view in elevation concentrates the transmitted energy in the region most likely to contain a target. The field of view in azimuth may be, for example, 30°, 50°, 90°, 120°, 150°, 180° or 360°, whilst the field of view in elevation may be, for example, 15°, 20°, 30° or 40°. The direction of maximum antenna gain for the receive antennas may be typically between 5° and 15° above the horizon, with 10° being a typical figure used. Depending upon the terrain in which it is used however, it may be used outside of these ranges, such as 0°, or 5° below the horizon.

The antenna may advantageously be arranged to have separate transmit and receive components. The transmit component may comprise a single element arranged to produce a transmit beam having a field of view as mentioned above. The receive component may comprise a plurality of antenna elements typically 3 to 6 in number, each arranged to receive from a part of the required field of view. Separating the transmit component from the receive component has the advantage that signal leakage from the transmitter to the receiver, often a problem in CW radar systems, may be more easily controlled.

The receiver, arranged to receive signals input via the receive antenna element(s) is adapted to provide down-converted signals to the processor. The receiver may advantageously use local oscillator signals generated in the transmitter to down convert received signals.

The processor is arranged to implement a Doppler filter, whereby signals received having Doppler frequency characteristics lower than a predetermined threshold are rejected as not being a target of interest.

The processor may also be arranged to perform a comparison of Doppler frequency characteristics, such as a velocity profile, of received signals against one or more expected characteristics. The expected characteristics may be previously measured characteristics of targets of interest, or may be theoretical characteristics produced by mathematical modelling of targets of interest. This approach can assist with rejection of signals from fast jets etc that may have similar basic velocities to targets of interest, but which are likely to differ in the detail of their respective velocity profiles.

In CW embodiments of the invention the CW signal generated by the transmitter may be unmodulated. This approach provides for simpler processing, and hence a lower cost solution. This does have the disadvantage however that no range, or target tracking Cartesian information is provided. Such information is not required for many operational setups—for instance where mere warning that a missile is in flight is desired, where velocity and/or angle measurements may be sufficient.

By modulating the CW signal, for instance using FMCW modulation techniques, an idea of the range of the target can be gleaned. By measuring Doppler and elevation information from the received radar signals over a short time, such as 0.2 s, 0.5 s or 1 s, an estimate of the likely impact area of the target can be produced, which can be used to reduce the number of alarms generated to just those that present the greatest danger.

The radar may advantageously be arranged to measure the elevation angle of the target. This may be done using interferometric, or monopulse techniques, e.g. by measuring relative phase of return signals at antennas having a vertical separation. This target elevation information may also be used in estimating an impact location of the target.

The radar may advantageously be arranged to measure the azimuth of the target. This may be done for example by using multiple receive beams, and identifying the beam or beams in which the target response is strongest. Monopulse techniques may also be used, which are capable of providing better accuracy. The azimuth information may be used to provide an estimate as to the point of origin, or the launch point, of the target.

The radar may be designed to operate in a frequency band wherein the wavelength transmitted is of similar order to, or smaller than, that of a physical feature or characteristic, such as the length or width, of the intended target.

An embodiment of the invention may operate at between 4 GHz and 6 GHz, such as at approximately 5 GHz.

Should a target be detected, then the radar is arranged to provide an indication to personnel in close proximity. This may be by audio or visual means built in to the radar, or may be by providing an alert signal to an external audio or visual means.

The radar is preferably arranged to provide an alert in as short a time as practically possible, so as to provide personnel with as much warning as possible. From the nature of the targets that may be detected, such as 107 mm SSRs, and the typical ranges from launch point to the operating base, this warning may be of the order 5-10 seconds. Such a warning is sufficient to enable the personnel to take cover.

A system as described herein will tend to have a naturally low false alarm rate. This is because, unlike many radars, the targets of interest tend to have a significant velocity difference compared to the clutter returns. Thus it is relatively simple to use a Doppler filter to select and process just those returns that produce a Doppler frequency in a band expected from the targets of interest. Despite this, an embodiment of the present invention is preferably adapted to incorporate additional processing to provide an estimate of a impact location of the target, and to generate an alert only if this impact location is within a predetermined area or distance from the radar. This estimate may be produced using, inter alia, range information extracted from returns in an FMCW radar.

Other parameters determined from the radar's received signals are also useful in assessing characteristics of the target's trajectory, or in assisting in an estimate of a likely impact location. The measurement of range rate (i.e. the rocket's radial component of velocity) and change in range rate (termed the radial acceleration) and change in the radial acceleration (termed the radial Jolt) is used to help identify the rocket from its known velocity, acceleration and jolt characteristics. In addition measurements of the radial velocity, acceleration and Jolt are used to determine the direction (and change in direction) of the target in order to estimate the trajectory of the rocket to assess its likely point of impact relative to the radar.

Note that jolt, i.e. the rate of change in acceleration, is referred to in some texts as jerk.

The present invention will now be described in more detail, by way of example only, and with reference to the following Figures, of which.

Figure 1:
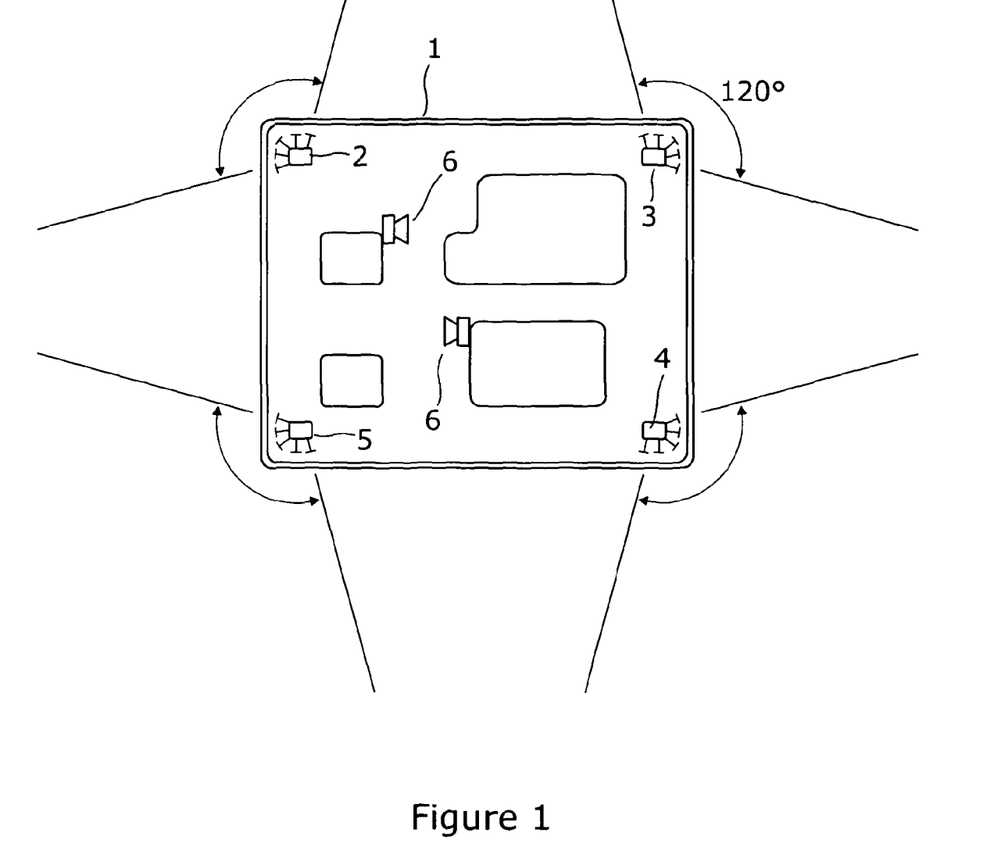
FIG. 1 shows a typical operational scenario of the present invention.

FIG. 1 shows a scenario in which an embodiment of the present invention is employed. An operating base 1 has radars 2, 3, 4, 5, located at its corners. Each radar 2-5 has an approximate 120° field of view, so providing full coverage around the base with some overlap. The radars 2-5 act independently of each other in terms of their target detection. A target approaching from a direction where coverage overlaps may therefore activate both corresponding radars. Transmit and receive elevation coverage of the radars is approximately 20°, with a lower −3 dB point of both the transmit and receive beams being arranged to be approximately coincident with ground level. Thus compared to traditional weapon detecting radars the beams in this embodiment of the current invention are arranged to be directed much lower down towards the ground.

Each radar has an operating range of approximately 2 km. The radars are coupled to a central warning system comprising a klaxon 6 operative when commanded by a radar. The warning system may be the WAVES system from MadahCom Inc. and the radars are adapted to provide an indication signal output compatible with the WAVES system.

Figure 2:
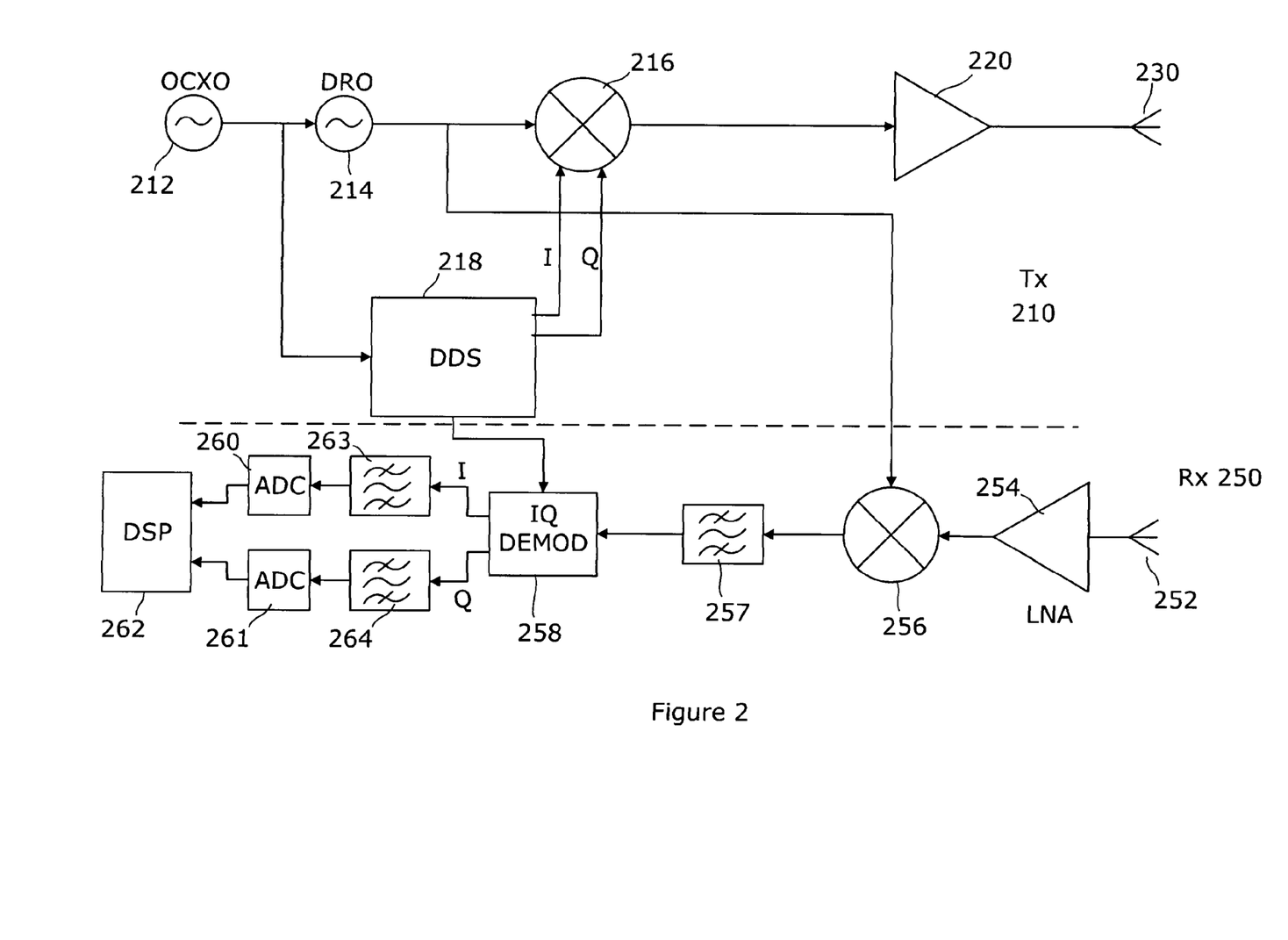
FIG. 2 shows a block diagram of hardware elements of an unmodulated CW embodiment of the present invention.

FIG. 2 shows a simplified block diagram of one embodiment of a radar according to the present invention, this being a pure (i.e. unmodulated) CW radar.

Radar 200 comprises a transmitter sub-system 210 and receiver sub-system 250. The transmitter sub-system provides an unmodulated CW signal to transmit antenna 230. The signal is at a frequency of 5.4 GHz, at a nominal power of 120 W. The transmitter itself comprises an oven controlled crystal oscillator (OCXO) 212 that acts as a system frequency reference. A dielectric resonant oscillator (DRO) 214 is phase locked to the OCXO 212. An output of the DRO 214 is mixed, in quadrature up-convert mixer 216, with I and Q outputs from a Direct Digital Synthesiser (DDS) 218. An RF output of mixer 216 is then amplified in power amplifier 220 and passed to antenna 230.

The use of DDS 218 provides frequency agility, and enables the operating frequency of the radar 200 to be chosen such that it does not interfere with other similar radars that may be located in relatively close proximity thereto. The antenna 230 has a −3 dB azimuth field of view (FOV) of 120° and elevation FOV of 20°. The antenna 230 thus provides a staring fan beam out towards a region of interest.

Receiver sub-system 250 comprises a six channel receiver, each channel comprising an antenna 252, low noise amplifier 254, down-conversion mixer 256, IF filter 257 I and Q demodulation 258, digitiser 260, 261 for digitisation of the I and Q channels, and signal processor 262. Filtering 263, 264 is provided as necessary to reject unwanted signals. It will be apparent to persons of ordinary skill in the art that other components, such as power supplies, controllers, limiters etc. are necessary to produce a practical, working embodiment, but these elements are of known type and thus will not be described further. I-Q demodulator 258 has an input from the DDS 218, and splits the signal received from IF filter 257 into I and Q signals. These are filtered 263, 264, and digitised 260, 261 before being processed in the DSP 262 The ADCs 260 261 may be clocked from a system clock derived from the OXCO clock reference 212.

The receiver arrangement shown is replicated for each channel, although the signal processor 262 is physically the same unit for each of the channels. The receiver 250 therefore comprises six independent receiver channels that each depend on common transmitter 210.

Figure 3:
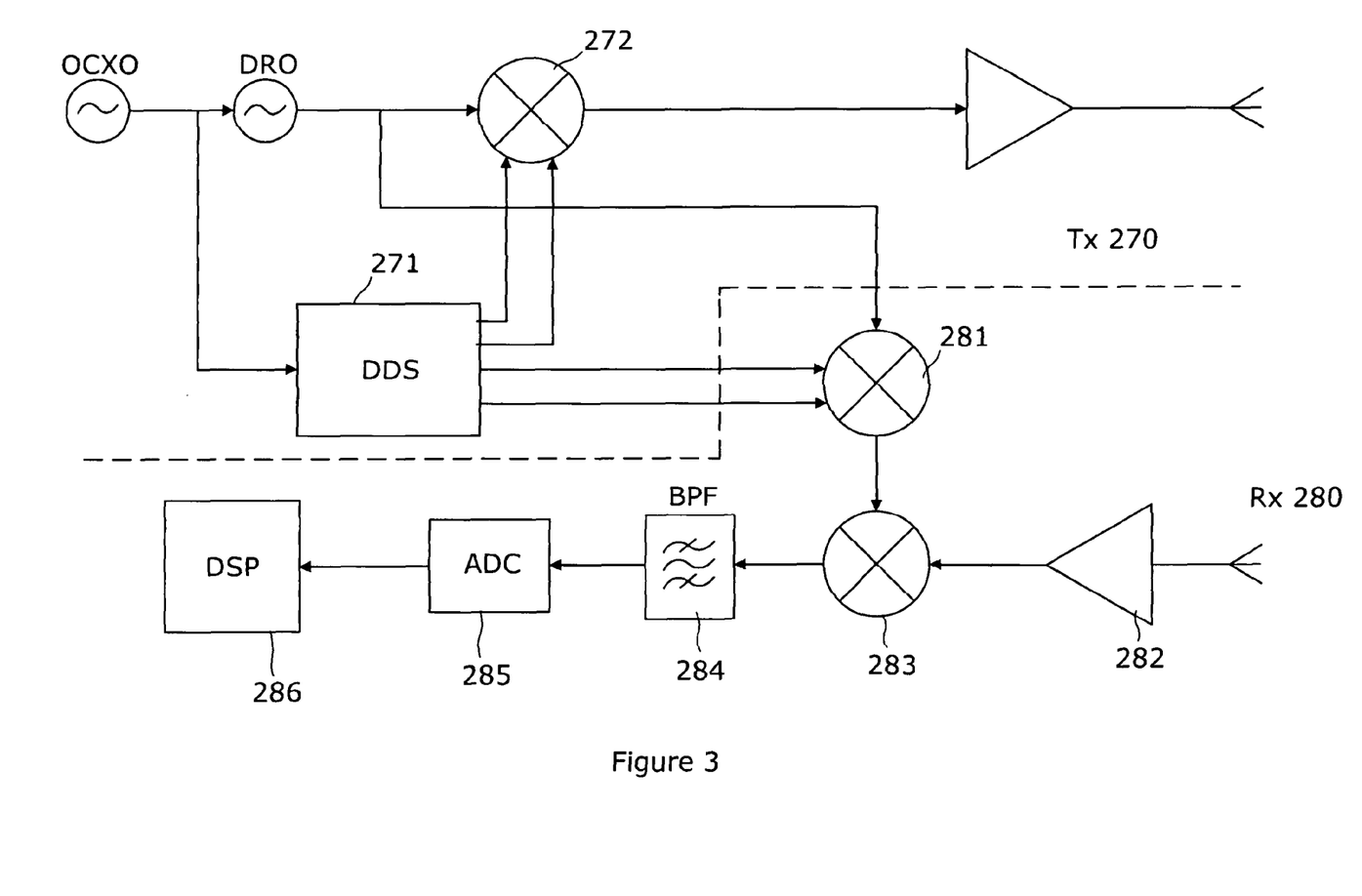
FIG. 3 shows a block diagram of hardware elements of an embodiment of the present invention capable of generating a modulated output.

FIG. 3 shows an embodiment of the present invention adapted to implement a modulated CW waveform. The embodiment shares some similarity with the embodiment described in relation to FIG. 2, so the description herein will concentrate on the differences over that of FIG. 2. The embodiment is again divided into a transmit section 270 and a receive section 280. The transmit section is similar to that of FIG. 2, except that the DDS 271 is arrange to provide additional outputs to mixer 281, as described below. The DDS 271 is also arranged to generate a modulation signal, such as a frequency ramp, and provide this to up-convert mixer 272. Thus the transmitted signal will be a modulated CW signal, the modulation dependent upon DDS 271.

The receiver section 280 comprises of an antenna 287, LNA 282 which amplifies received signals from the antenna, and provides them to IF mixer 283. A second input to the mixer 283 comes from mixer 281, and comprises a waveform having the same modulation as the transmitted signal. Mixer 281 takes an input from DDS 271, which may be controlled independently from the DDS signal provided to mixer 272. This gives flexibility in allowing different ranges to be selected, by adjusting a time delay between the signal provided to the transmit side mixer 272 and that provided to the receive side mixer 283. The delay and centre frequency may be chosen so that returns from a selected range correspond to the pass band of filter 284. This pass band has a centre frequency, i.e. an IF frequency, of 70 MHz.

The 70 MHz IF is filtered in band pass filter 284 and digitised in ADC 285 at a rate of 500 KHz, which is at least twice the frequency of the useful information content in the IF signal. The I-Q demodulation takes place in the DSP, and so saves some of the hardware used in the embodiment shown in FIG. 2. Note that the normally skilled person would realise this digital I-Q generation can also be employed with the unmodulated CW signal embodiment of FIG. 2, likewise the analogue IQ generation in that embodiment can be used in this one also.

The modulation added to the CW signal is typically a frequency ramp, although other waveforms may be used. For example, a phase coding may be employed in known manner. Likewise an amplitude coding may be used, effectively resulting in a pulsed system.

The modulation used in one embodiment is a positive linear frequency sweep, repeated at a rate of approximately 30 kHz, with a sweep of 1 MHz.

The embodiment described in relation to FIG. 3 has the capability to switch between a state wherein it provides an unmodulated output and one where it provides a modulated output, by programming the DDS and DSP appropriately. This allows a working scenario wherein the radar is first operated in an unmodulated CW mode. The signal processing requirements of this mode are simpler, and hence quicker. Therefore the time taken to detect an incoming threat may be reduced. Once a target is identified as being present then the radar can switch to a modulated mode that is able to measure the range of the target. The range measurement can be useful as described herein in identifying a likely impact location of the target.

Figure 4A:
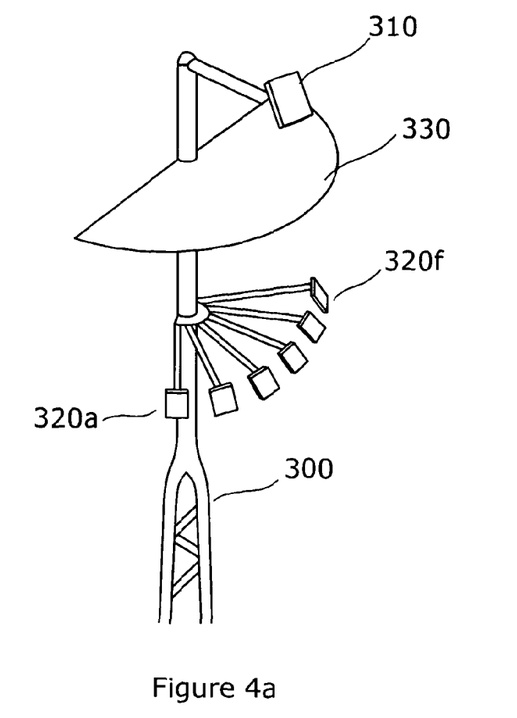
FIG. 4 diagrammatically illustrates an antenna arrangement that may be employed in an embodiment of the present invention.
Figure 4B:
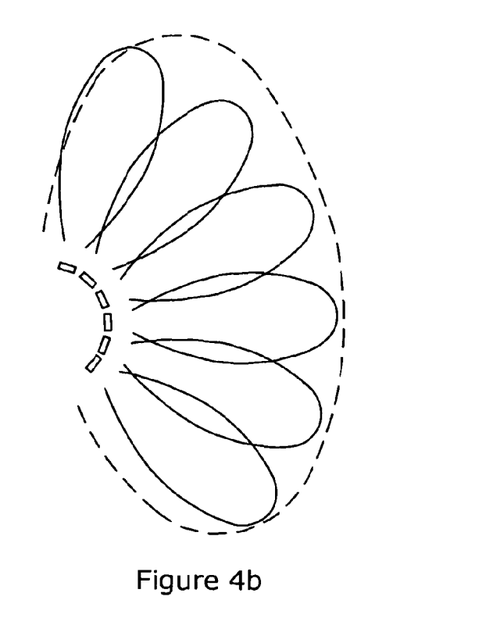

With reference to FIGS. 4a and 4b the antenna arrangement used in an embodiment of the present invention is illustrated. A vertical mast 300 has mounted thereupon a transmit antenna 310 and six receive antennas 320a-320f. Separating the transmit and receive antennas is a septum 330 of broadly semi-circular form. The mast is of adjustable height, and typically would be adjusted so that the transmit antenna is at a height of around 5-6 m. A separation of around 1.5 metres between the transmit and receive antennas is made to provide isolation between the two. The septum 330 provides significant additional isolation between transmitter and receiver. The isolation between transmitter and receiver is an important factor in this embodiment of the invention. As the radar operates in CW mode then any coupling of the transmit signal into the receiver will directly degrade the detection performance of the system.

The transmit antenna 310 is a slotted waveguide antenna having an azimuth −3 dB beamwidth of approximately 120°. Each receive antenna is a patch antenna having an approximate 20° azimuth beamwidth. The six receive antennas 320a-320f are arranged in an arc formation so that the beam pattern of each meets that of its neighbour at its half power point, as shown by the solid lines in FIG. 4b. The dotted line shows the transmit antenna beam pattern.

Of course other antenna types, such as dipoles, or dipole arrays, could also be used.

Each receive antenna 320a-f is connected to its associated receive chain as described with reference to FIGS. 2 and 3.

Other antenna topologies may be used. For example a single antenna common to the transmitter and receiver may be used if adequate measures are taken to prevent signal leakage from the transmitter directly to the receiver. Such methods are known. For example circulators are known that can provide around 30 dB of isolation, and active signal cancellation techniques can improve on this, albeit at greater cost in terms of design and development effort required.

Figure 5:
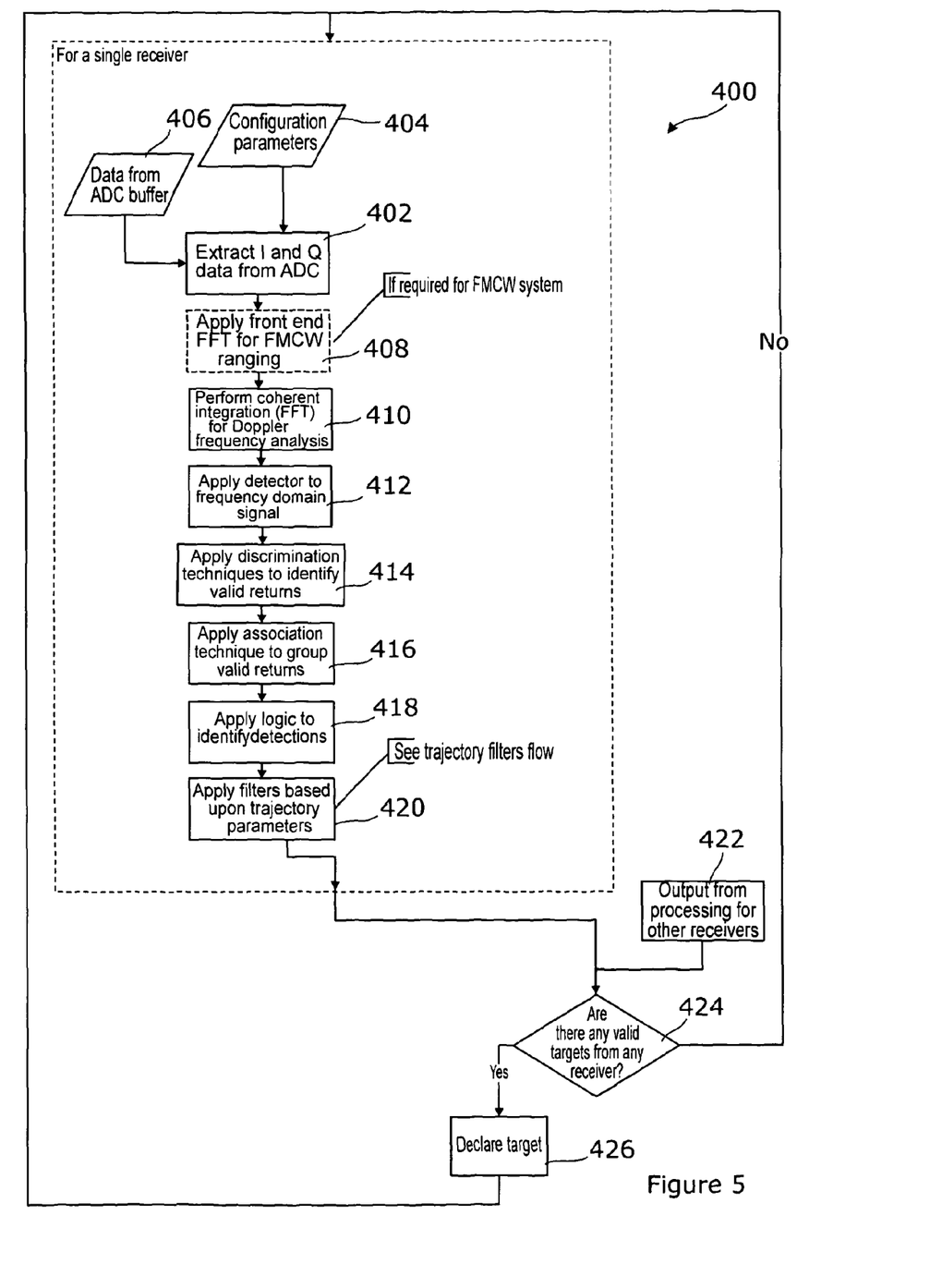
FIG. 5 shows a block diagram of the processing steps used in some embodiment of the present invention.

FIG. 5 shows a block diagram of the processing steps that are used in a CW and an FMCW embodiment of the present invention. Note that the steps marked by a dashed line are those that apply only to the FMCW embodiment, with the other steps applying to both embodiments. The processing steps are carried out for each receiver chain in the Signal Processing block 262 and 286 as shown in FIGS. 2 and 3.

Digital data representative of radar returns are received 402 from memory buffers 406 associated with the analogue converters, this data being separated into an I and a Q channel. Configuration parameters 404 connected with the desired detection thresholds, along with other setup parameters associated with the radar are obtained from a system controller.

For an FMCW embodiment, such as that described in relation to FIG. 3, the samples gathered over each frequency sweep period are transformed 408 to the frequency domain, using a fast Fourier transform (FFT) algorithm. For linear frequency sweep modulation this provides range segmentation information which may be used subsequently to help estimate a likely landing location of the target, as explained later. A number of range bins are created by the FFT process, the number being equal to half the length of the FFT performed.

The data obtained over a dwell period of 20ms is then processed 410. For an unmodulated CW embodiment this processing comprises coherent integration over the dwell period, performed using an FFT. The output is Doppler information, thus allowing extraction of targets matching known velocity characteristics.

For the FMCW case this data will be the outputs of the many (approximately 100) FFTs carried out in that 20 ms dwell period. The data is coherently integrated in the following manner. Outputs from bin 1 of each FFT taken during the dwell period are then processed using an FFT algorithm. The same occurs for bins 2 to n, where n is the number of range bins. These outputs form an array of data. The output of this array is a series of bins in which each contains Doppler information for a given range. A Doppler monopulse process may be applied to the Doppler information in the series of bins, to obtain improved resolution than is attainable from the FFT process alone.

The Doppler information obtained from the unmodulated CW or from the FMCW is then applied to a detector 412. This comprises thresholding the Doppler information against a threshold determined using Constant False Alarm Rate (CFAR) principles. For each Doppler bin a time history of levels is produced to provide a noise estimate. This noise estimate is then used to calculate a threshold to achieve a predetermined false alarm rate in known manner. If the level goes above the threshold then a detection is assumed.

All detections from step 412 are then applied to a discriminator 414. This removes detections that are outside the upper and lower limits of the Doppler frequency for the targets of interest. Any detections that remain are analysed to see whether they are likely to be frequency harmonics of slower objects such as cars, or caused by helicopter blade flash, or amplitude modulated signals caused by, for example fans or vibrating structures. This discrimination is done using known techniques. Multiple detections that have not been rejected are subject to a cluster analysis, which determines whether they are likely to result from a single target. This looks at, for example, whether the multiple detections are all very close to each other. Techniques for cluster analysis are known, and will not be described in detail herein.

Detections that survive the discrimination step, i.e. those signals that make it past the detector 412 and discriminator 414, are then subjected to an association step 416. This looks at detections in previous dwells and performs an association stage to associate the present detections with them.

This therefore reduces false alarms due to a single target being mistakenly registered as two separate targets in successive dwells. A logic test is then applied 418, wherein if five out of the last seven dwells has a detection that passes the discrimination and association steps then a target is confirmed. Of course, other logical analyses may be performed as required, according to desired false alarm rates, target detection time specifications etc. For example, in a very simple case a target may be declared if a single detection is made in a single dwell period.

Some embodiments of the invention may use the output of the detection process at this stage to initiate an alarm. The system may however be susceptible to targets having the correct velocity characteristic, but which are of no danger, such as friendly low flying aircraft, or missiles that will not land near to the operating base. Additional filtering 420 may therefore be employed to detect these and so prevent an alarm from being sounded when they are found. The filtering employed on some embodiments of the invention is described in more detail in relation to FIG. 6.

The rejection of some detections using these discrimination techniques results generally in a much reduced system false alarm rate.

The output of the filtering process 420 is an indication of whether a target of interest that has appropriate trajectory parameters (i.e. that it is expected to land in or close to the operating base) has been detected from that receiver. The outputs from this and all other receivers 422 are examined 424, and if any of them have detected a target of interest the radar system declares this 426, and a signal is sent to a klaxon. Whether or not a target is declared the radar will continue to process its returns in similar fashion as described above, and will declare targets as and when they are detected.

Figure 6:
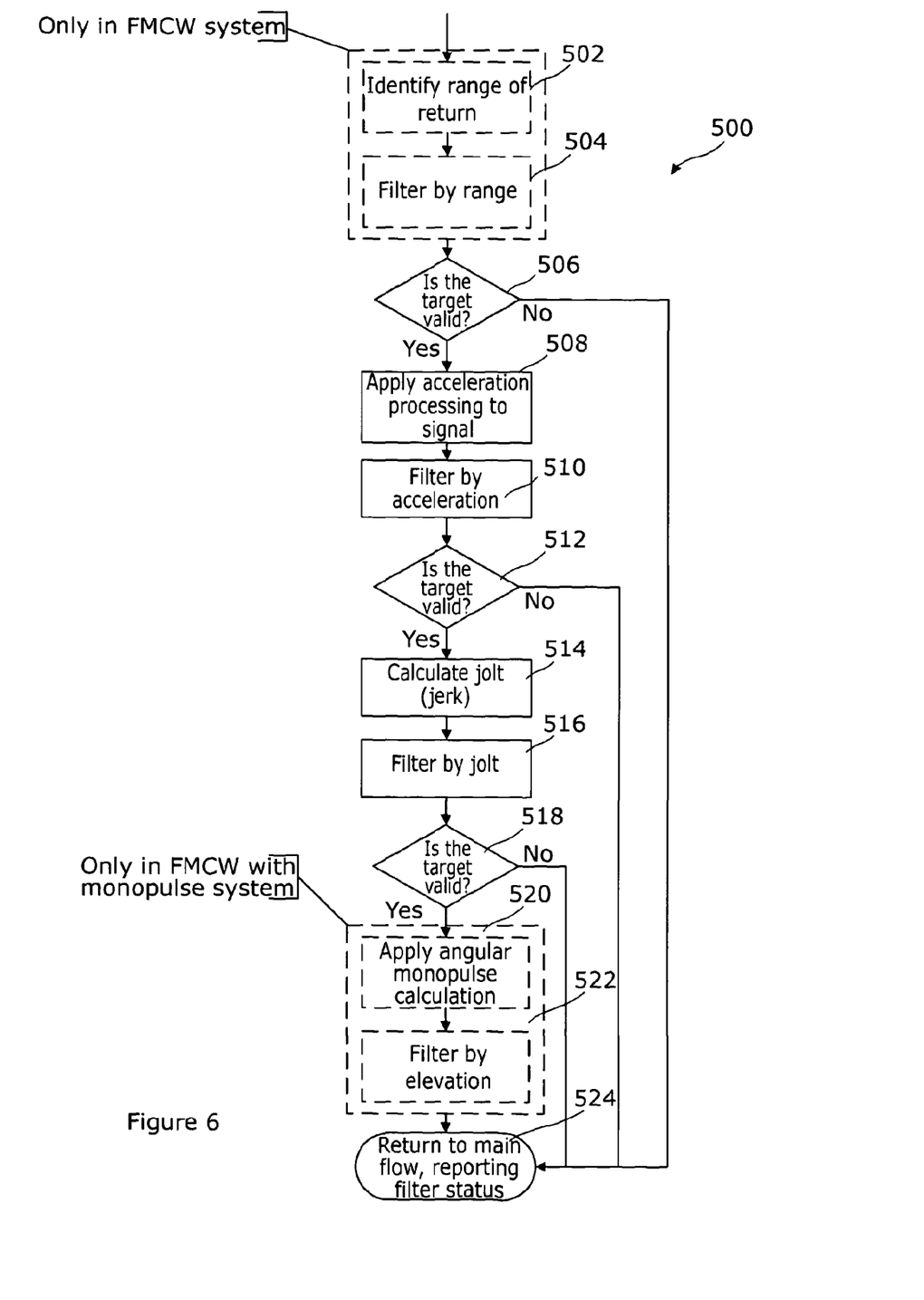
FIG. 6 shows a block diagram of target filtering steps that may be done in some embodiments of the present invention.

FIG. 6 is a block diagram of additional target return filtering 500 that is performed in certain embodiments of the present invention. It provides a more detailed view of block 420 in FIG. 5, and is used where it is desired to get an estimate of the landing position of a detected rocket, and in some embodiments to obtain point or origin information. Note that those parts indicated by dashed boxes are applicable to FMCW embodiments only.

The additional filtering comprises measuring the target's range 502, radial acceleration 508, radial jolt 514 and elevation 520, and rejecting or accepting the target based upon the values obtained. The system has a target ballistic table that has values for each of these parameters, and can reject the target if one or more of the values indicates the target is not likely to land in, or close to, the operating base. For example, for a given range, acceleration and jolt, if the elevation is too high then, from the prior knowledge of the target trajectories stored in the table of ballistics, the target may be rejected as being likely to land beyond the operating base. A similar process can be carried out for each of the other parameters.

The input is radar return information that corresponds to detected targets from step 418 of FIG. 5.

The table of ballistics may be derived from measurements taken of actual targets, or may instead be derived from computer models of the behaviour of such targets. The table may have a set of different values that relate to different target ranges and different target (e.g. rocket or missile) types. This approach may also be used to identify the type of rocket or missile as well as a likely impact zone, for example by matching parameters measured for a target against the sets of values to identify which is the best match. The table may also have different sets of values for different prevailing weather conditions, as things like air pressure, temperature and wind can all affect the likely impact zone. The prevailing weather conditions may be determined by a set of sensors in traditional fashion, and information from these fed into the system.

Although the filters 502, 508, 514, 520 are all shown as being applied in a particular order, in practice they may be applied in any order, and this order may be governed in practice by what resources are available at a given instant in the signal processor 262 that implements these filters.

Figure 7:
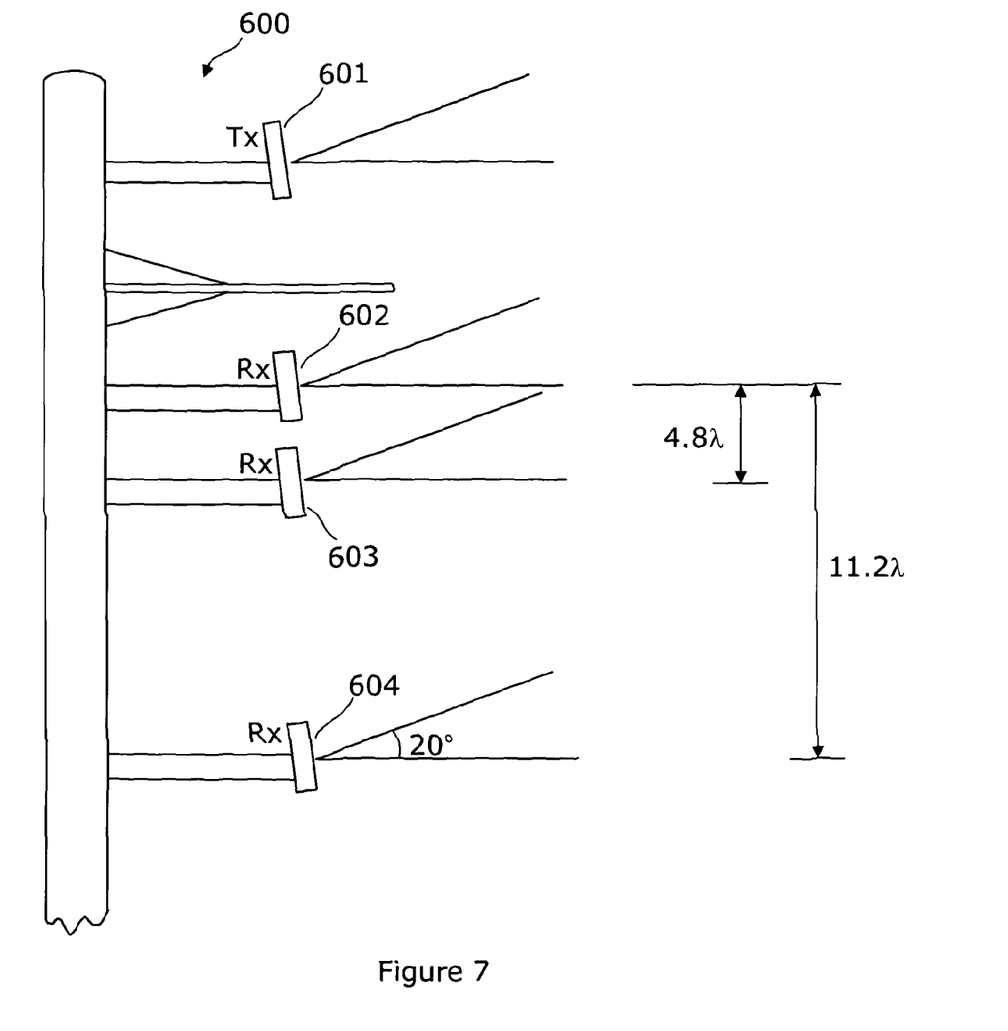
FIG. 7 diagrammatically illustrates an antenna arrangement that may be used to implement a phase monopulse, or interferometer, in elevation.

FIG. 7 shows an antenna arrangement 600 suitable for an embodiment of the present invention, wherein phase monopulse, otherwise known as interferometry, is performed in elevation, to provide more information as to a likely landing position of the target.

A single transmit antenna 601 is provided Three rows of receive antennas 602-604 are provided. Note that only a single antenna in each row is shown, but in practice six (or seven if azimuth monopulse is performed—see below for details of this) antennas will be present in each row. Septum 605 is provided between the transmit and receive antennas to increase isolation between the two. A separation of 4.8λ is arranged between the top two rows of receive antennas 602, 603, and a separation of 11.2λ is provided between the top 602 and bottom 604 rows. This provides three different baselines to be used, i.e. between the top and middle, the top and bottom, and middle and bottom. In practice sufficient accuracy may often be achievable by using two baselines. Each antenna has a −3 dB beamwidth in both elevation and azimuth of 20°.

Target returns received by antennas in two or more of the rows are examined and phase components of the modulation signal are compared. With knowledge of the baseline separation between rows, an approximate elevation angle of the target may be computed, using techniques commonly employed in interferometry or phased array antenna systems. As stated above, knowledge of the elevation angle of the target may be used in estimating a likely landing position of the target.

An embodiment of the present invention may employ monopulse techniques in azimuth. Using antennas that have wider azimuth beams, and arranging for these beams to overlap to a sufficient degree, known monopulse techniques may be used to estimate an accurate azimuth direction of the target. This can be used to detect a likely launch position of the target, which can be used to direct weaponry accordingly. An embodiment adopting this approach may have antennas that overlap at the −3 dB point not with its nearest neighbour, but with the next antenna along. A set of sum beams may be created by summing the output of each antenna with that of its nearest neighbour. To create six azimuth receive beams, seven antennas are therefore used. Difference beams are created in similar fashion, by subtracting each beam from that of a nearest neighbour.

To provide 120° coverage in azimuth each of the seven antennas has a beam width in azimuth of 40°, so that the sum beams have a beam width of 20°, with six sum beams being created in total.

The coverage in azimuth may be extended to any arbitrary angle, up to 360° by including more or fewer antennas, both in transmit and receive. Of course, the coverage in receive would be in 20° increments using the antennas as described above, but other antennas may be used that have different angular coverage.

For those embodiments comprising multiple rows of receive antennas, each at different elevations, the monopulse in azimuth may be implemented in a different manner. Each row may comprise antennas each having a 20° azimuth beam width, arranged so that the −3 dB points of each intersect with those of its nearest neighbours. Each such row will then be able to provide an azimuth monopulse function (i.e. generate sum and difference beams) over a more limited extent, in that there will be gaps in angle over which no sum and difference beam patterns may be generated, because the signal strength from a given antenna, working at the edge of its angular coverage, will be too weak. These gaps will be present in the vicinity of the peak of each of the individual antenna beam patterns. However, these gaps may be filled by the other rows, by squinting the beam pattern of the individual antennas of the other rows by an angle of approximately a half of the 3 dB beam width of the individual antennas. Monopulse in azimuth is then implemented separately in each row, but wherein the coverage gaps in a given row are filled in with monopulse coverage in the remaining rows. This approach has the advantage of having higher antenna gain whilst still providing monopulse in azimuth.

As the antennas in embodiments of the present invention are arranged to receive energy from very low angles, they are susceptible to multipath signals caused by reflections from the ground. Various methods may be used to mitigate this problem, each of which involve generating nulls in the antenna pattern on receive in likely directions of multipath signals. One such method may be to have a separate receive antenna, coupled to its own receive chain and arranged to measure signals from the direction of likely multipath responses. The effects of these multipath signals received by this antenna may then be subtracted from the signals received by the main receive antennas, to provide a cancellation of the multipath signals. A disadvantage of this approach is the requirement for extra hardware in the form of an extra antenna and receiver. Another such method is to employ adaptive beamforming, which can be done in those embodiments employing two or more antennas arranged as a vertical array. Phases of returned signals may be manipulated using known techniques to minimise the effect in the receiver of energy coming from the direction of the multipath signals.

A third approach to mitigating the effects of multipath, that may be used where there is a vertical array of antenna elements, is to calculate a series of vertical beam patterns in receive, with a main lobe being produced in the general direction (in elevation) where targets may be expected, and wherein a null is produced in known, different directions in each, but always in the general direction of where the multipath signal is expected to come from. If a strong multipath signal is present then the received signal from the target will tend to vary significantly in amplitude between different beam patterns over a short time sequence. Therefore the processor may be arranged to select the beam pattern (i.e. the pattern having a null in a particular direction) that has a consistently strong and stable signal over the short time sequence, and the multipath signal may be assumed to come from the direction of the null.

The antennas in the above examples have all been described in terms of being physically fixed systems. Other embodiments of the invention may however use rotating antennas. The rotating antenna may rotate at a rate typically between 2 Hz and 8 Hz. A faster rotation is advantageous in embodiments of the present invention as it will reduce latency between a rocket being launched and it being detected.

The above examples have been disclosed for illustrative purposes, and those skilled in the art will appreciate that various modifications, additions and substitutions are possible, without departing from the scope of the invention as disclosed in the accompanying claims.

The invention claimed is:

1. A system for the detection of munitions, the system comprising a radar, processing means and an indicator wherein the radar has a transmitter, a receiver, a transmit antenna, and one or more receive antennas arranged to transmit a signal and to receive reflections of the signal from a region,
   wherein the transmit and receive antennas are arranged to have transmit and receive beams oriented to include ground level coverage, wherein the one or more receive antennas comprise a plurality of antenna elements arranged to provide a plurality of receive beams, each having an associated receiver chain,
   and wherein the processor incorporates a Doppler filter arranged to reject received signals corresponding to a target outside of predetermined velocity limits, these velocity limits being chosen as representative of maximum and minimum velocities of the targets of interest in flight,
   the processor further being arranged to estimate, using the received signals, an impact location of a detected target,
   and further wherein the indicator is adapted to provide an indication when the estimated impact location is within a predetermined area or distance from the radar.

2. A system as claimed in claim 1 wherein the one or more antennas has a single transmit beam of relatively wide angular coverage in azimuth, and a plurality of relatively narrow receive beam lobes that together have similar angular coverage to the transmit beam.

3. A system as claimed in claim 2 wherein the transmit beam has an angular coverage of between 40° and 360°.

4. A system as claimed in claim 3 wherein the transmit beam has an angular coverage of between 90° and 130°.

5. A system as claimed in claim 1 wherein the antenna is a fixed orientation antenna.

6. A system as claimed in claim 1 wherein the processor is additionally arranged to measure a Doppler profile of received signals, and to match the profile against that expected for a target of interest, and to reject signals that do not match the expected profile.

7. A system as claimed in claim 6 wherein the processor is arranged to process returns to detect target range, radial acceleration and radial jolt parameters, and to filter out responses if the acceleration is not within predefined limits, as defined in a look-up table.

8. A system as claimed in claim 1 wherein the radar is arranged to transmit an unmodulated continuous wave (CW) waveform.

9. A system as claimed in claim 1 wherein the radar is arranged to transmit a modulated Continuous Wave (CW) waveform.

10. A system as claimed in claim 9 wherein the system further comprises a switch for switching between an unmodulated CW mode and a modulated mode, wherein it is arranged to operate initially in an unmodulated CW mode until a target detection has occurred, and to switch to the modulated CW mode following the detection, to provide target range information.

11. A system as claimed in claim 1 wherein the receive beams comprise sum and/or difference beams, the sum and/or difference beams being created by vectorial addition and/or subtraction of individual receive antenna beams.

12. A system as claimed in claim 1 wherein, on receive, the antenna is arranged to have a plurality of antenna elements spaced in elevation to allow the receiver to implement interferometric target elevation measurement.

13. A system as claimed in claim 1 wherein the system is adapted to generate one or more nulls in the direction of the ground where ground reflections are likely to result from a target.

14. A system as claimed in claim 3 wherein the receive beam lobes are processed to provide monopulse functionality in the azimuth plane, and to indicate a likely launch point of the target.

15. A system as claimed in claim 1 wherein the indication means comprises a siren, klaxon, or other audible indicator.

* * * * *